United States Patent [19]

Bright

[11] 4,036,270
[45] July 19, 1977

[54] LOG PEELING MACHINE

[75] Inventor: Kenneth G. Bright, Camas Valley, Oreg.

[73] Assignees: Robert L. Westbrook; Henry Westbrook, III, both of Smith River, Calif. ; part interest to each

[21] Appl. No.: 618,628

[22] Filed: Oct. 1, 1975

Related U.S. Application Data

[63] Continuation-in-part of Ser. No. 529,814, Dec. 5, 1974, abandoned.

[51] Int. Cl.$^2$ .............................................. B27L 1/00
[52] U.S. Cl. ............................ 144/208 E; 144/246 F; 144/249 A; 198/645
[58] Field of Search ........... 144/208 E, 242 R, 242 C, 144/242 D, 242 K, 246 C, 246 F, 249 R, 249 A, 311; 92/62, 66; 198/165, 167

[56] References Cited

U.S. PATENT DOCUMENTS

| | | | |
|---|---|---|---|
| 1,176,452 | 3/1916 | Hubbell | 144/208 E |
| 2,374,429 | 4/1945 | Hayes | 144/208 E X |
| 2,655,961 | 10/1953 | McComb | 144/208 E |
| 2,860,672 | 11/1958 | Brundell | 144/208 E |
| 2,918,952 | 12/1959 | Searle | 144/208 E |
| 3,045,728 | 7/1962 | Huthinson | 144/208 E |
| 3,047,035 | 7/1962 | Mullis | 144/208 E |
| 3,371,770 | 3/1968 | Graham | 198/167 |

FOREIGN PATENT DOCUMENTS

| | | | |
|---|---|---|---|
| 122,026 | 6/1948 | Sweden | 144/208 E |

Primary Examiner—Gary L. Smith
Attorney, Agent, or Firm—James D. Givnan, Jr.

[57] ABSTRACT

A log peeling machine having a rotatable peeler drum assembly located intermediate a log infeed conveyor apparatus and an outfeed conveyor apparatus both of like construction. Each conveyor apparatus includes a conveyor assembly disposed beneath the log being peeled and a cooperating hold down assembly disposed thereabove which jointly confine and propel the log along an axis coaxial with the peeler drum. Pairs of hydraulic cylinders position both the conveyor assembly and the hold down assembly of each conveyor apparatus for uniform travel of same toward and away from the projected axis of the cutter drum. The hydraulic cylinders are in fluid, series communication to assure uniform fluid displacement and synchronized travel of the conveyor and hold down assemblies. The peeler drum assembly swingably mounts cutter head assemblies served by a rotating tank structure. Radio transmissions control peeler drum operation.

33 Claims, 14 Drawing Figures

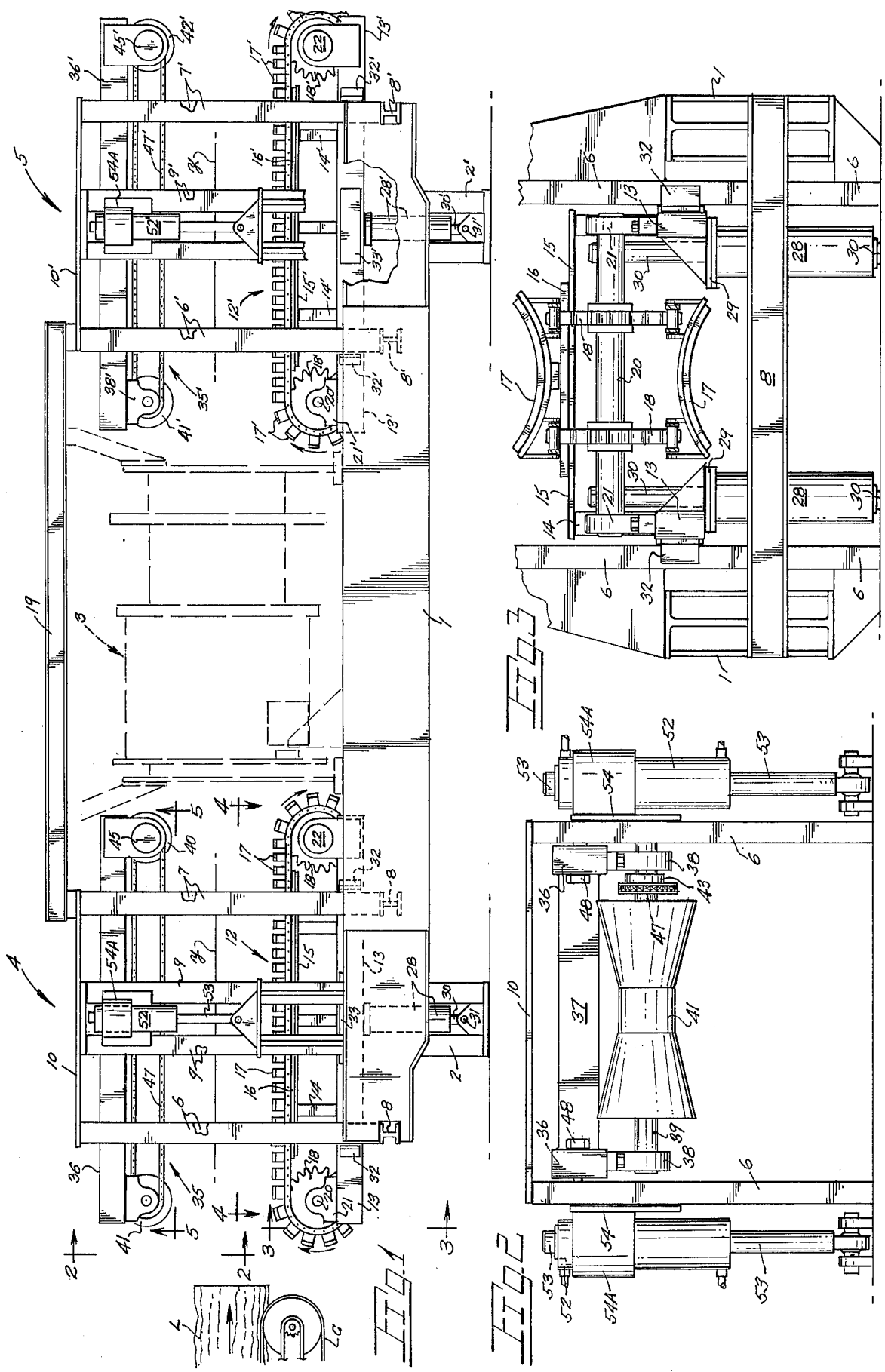

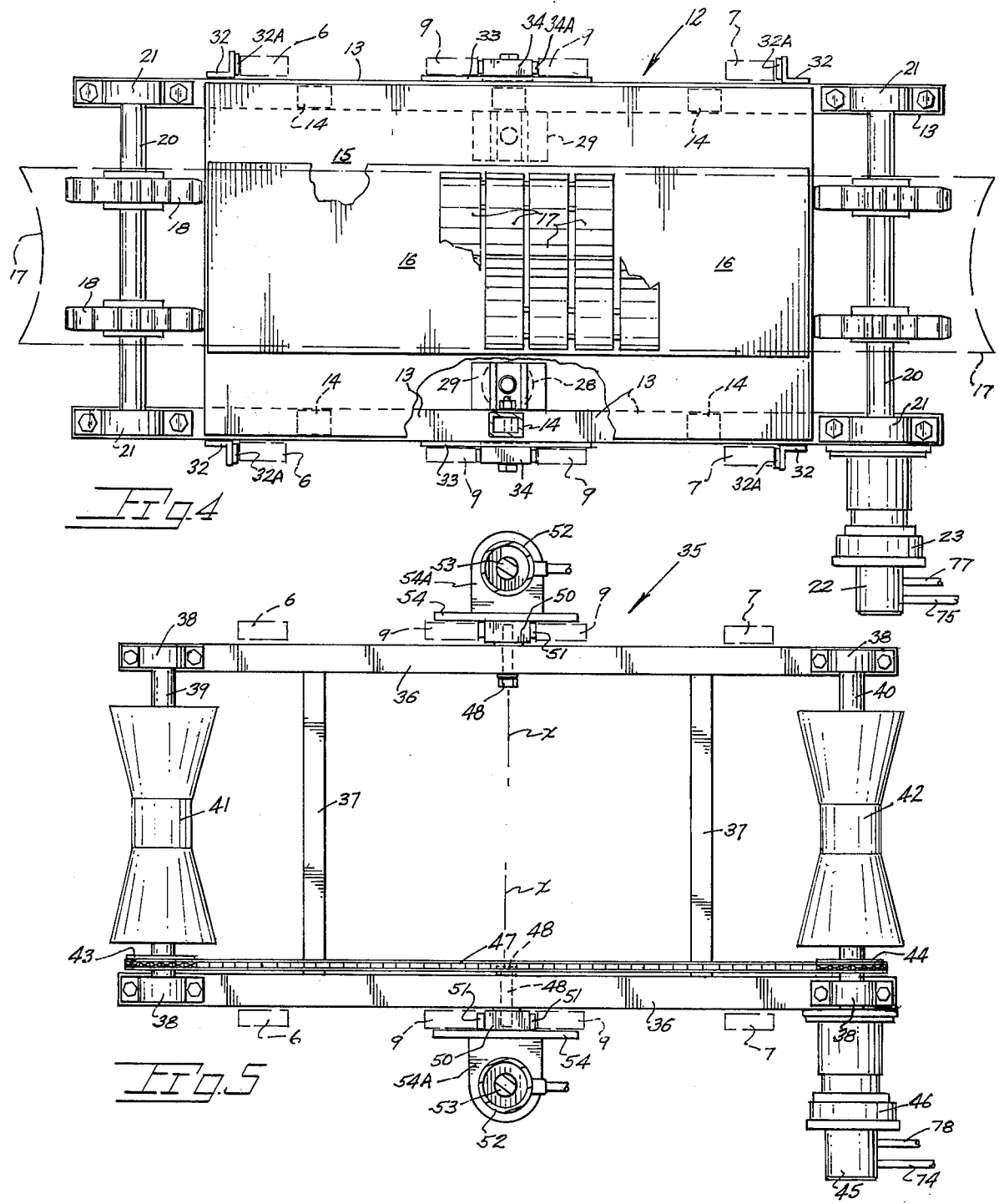

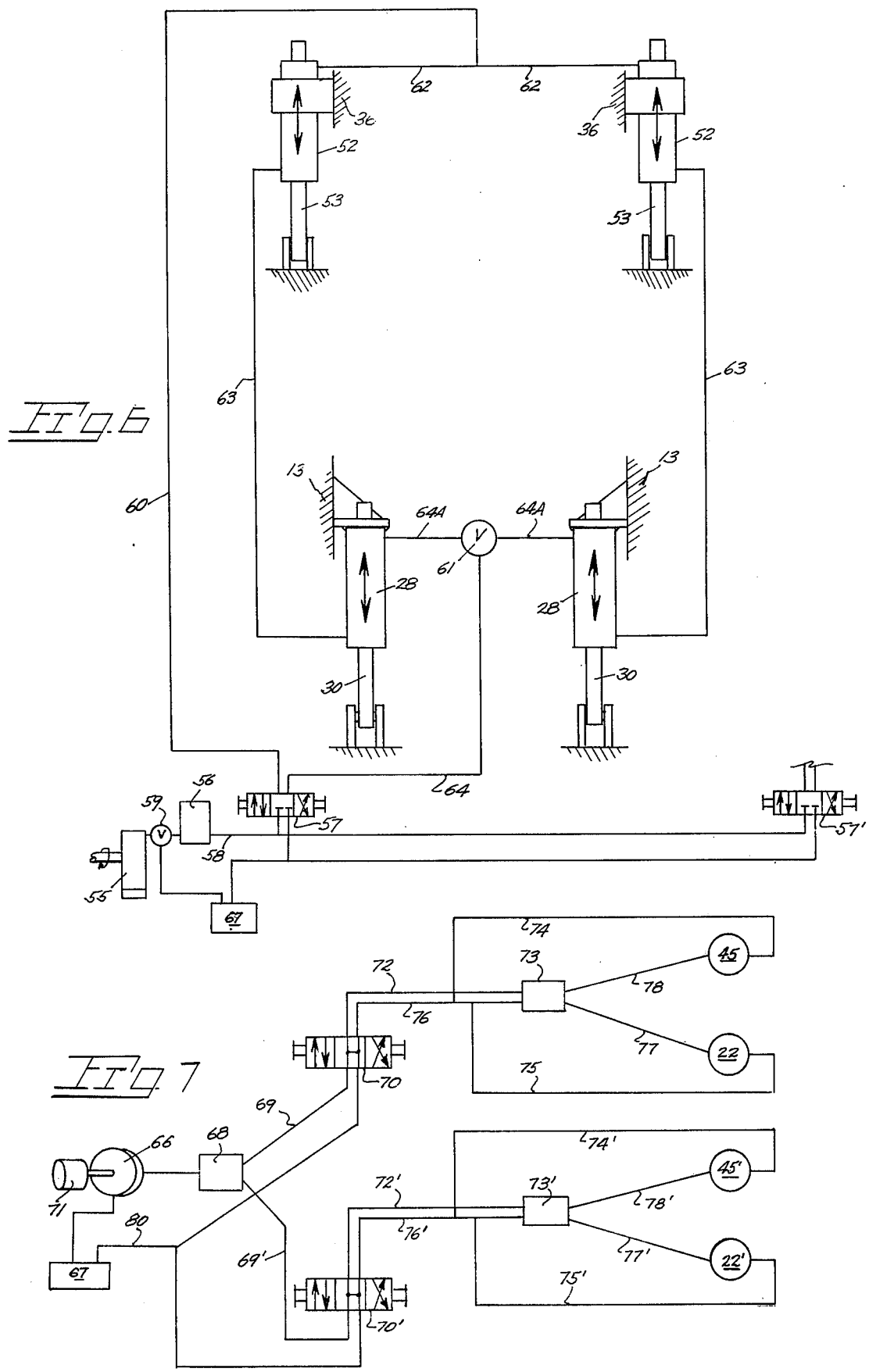

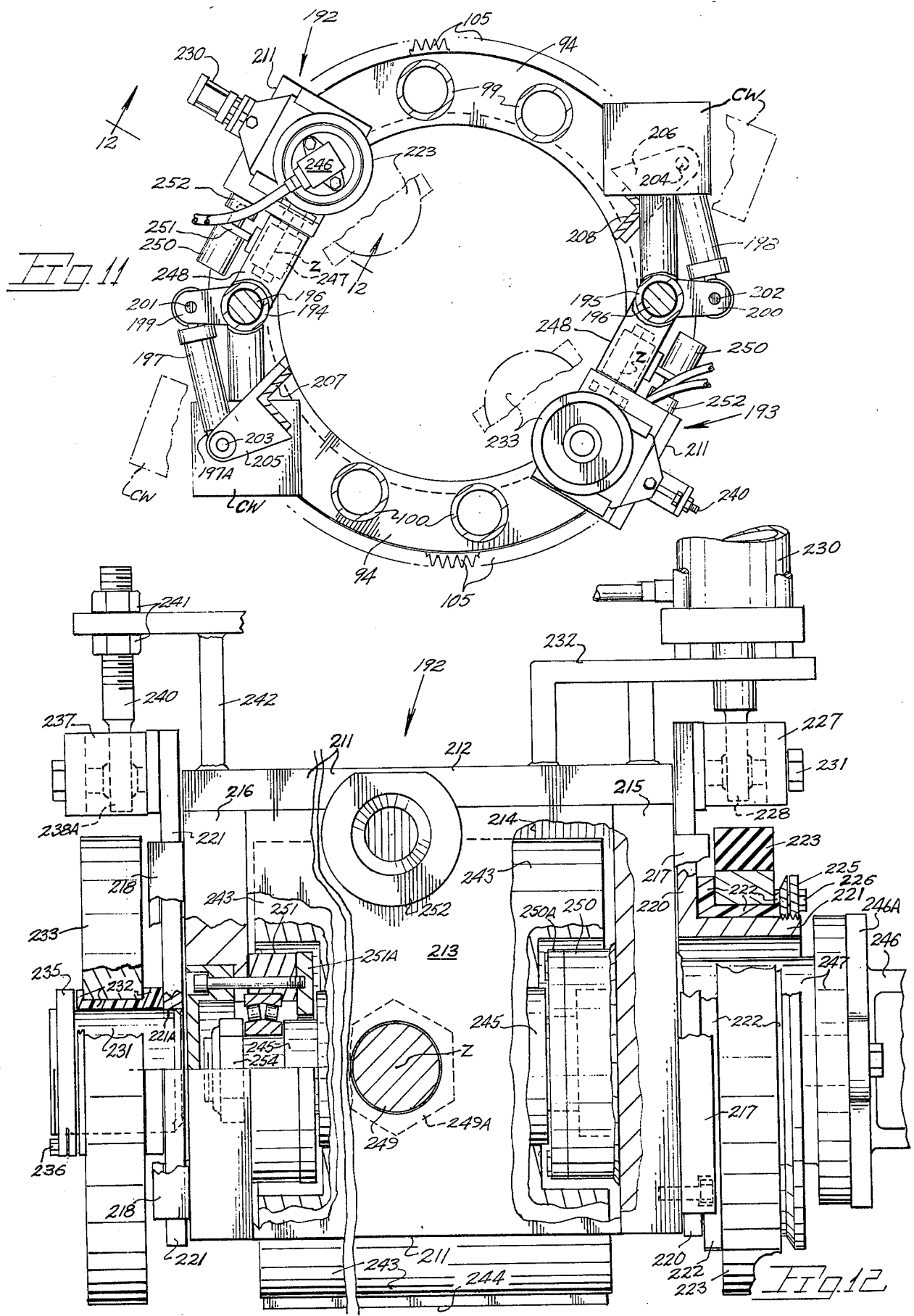

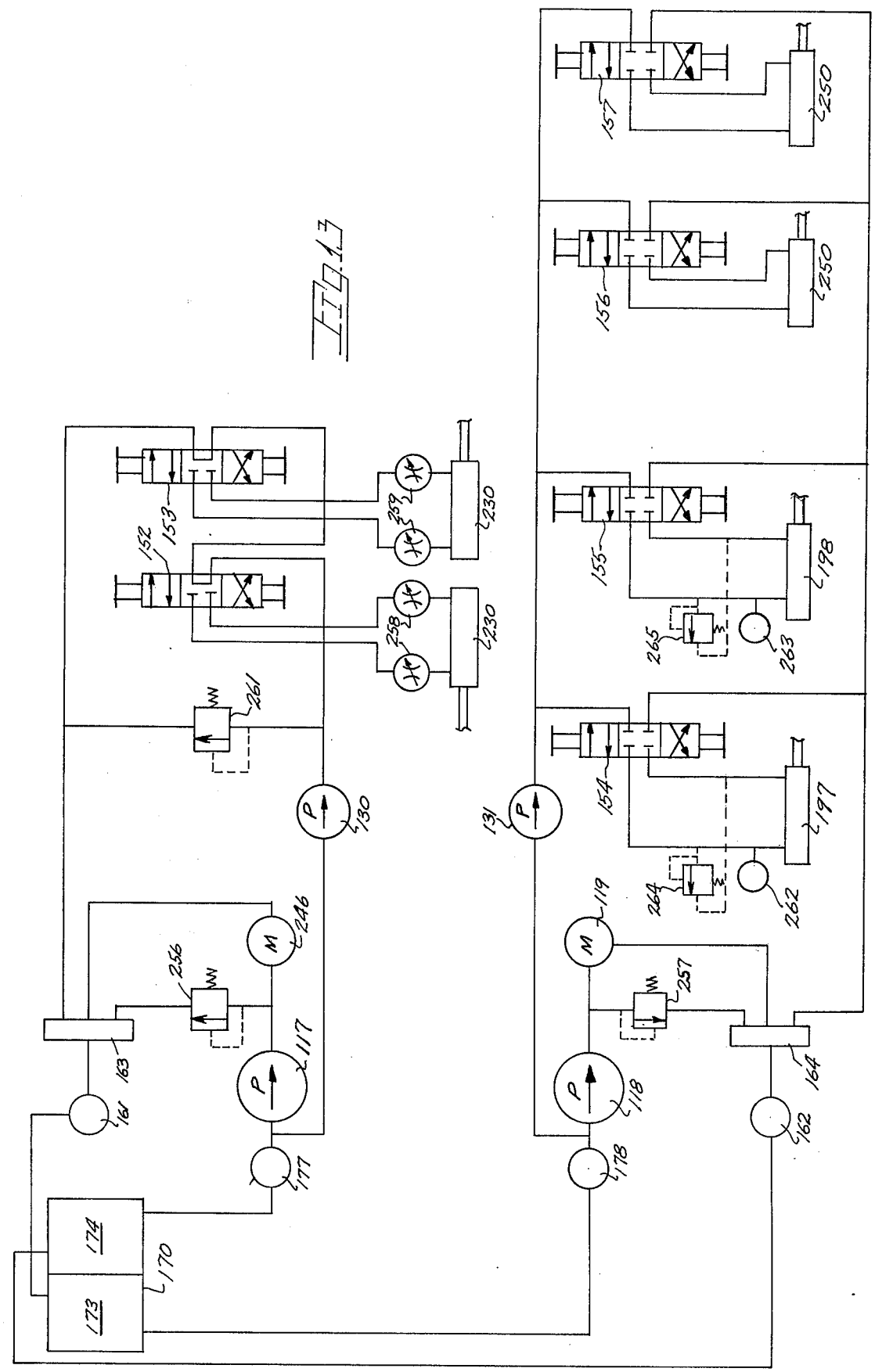

LOG PEELING MACHINE

BACKGROUND OF THE INVENTION

The present application is a continuation-in-part of my copending U.S. patent application bearing the same title filed Dec. 5, 1974 under Ser. No. 529,814 now abandoned.

The present invention is embodied within a machine for removing bark and that portion of the cambium layer necessary to properly shape the pole being made.

To the extent the prior art is known, existing arrangements for moving a log past a peeling instrumentality do not provide for precise linear travel of the log along a fixed axis. Most often peeling rings or drums are shifted up or down to receive logs of varying sizes. A number of peeling machines require the log to be rotated during travel resulting in an orbiting log axis at the log ends and erratic peeling. Accordingly, in an effort to mitigate dynamic problems resulting from log rotation, rotational speed of the log is necessarily slow resulting in a slow peeling operation. As log diameters and lengths increase the dynamic problems become even more significant. A further drawback to existing peeling machines is their degree of accuracy as excessive removal of the underlying sap wood layer will result in costly discard or lower classification of the log. A still further drawback to known peeling machines is their log size limitation rendering them unusable for the manufacture of longer, larger diameter poles ranging up to 120 feet in length and up to 36 inches in diameter.

SUMMARY OF THE PRESENT INVENTION

The present invention is embodied within a machine for removal of bark and a minimum amount of the cambium layer from a log for shaping purposes in the manufacture of a pole. The infeed and outfeed apparatuses impart longitudinal movement to the non-rotating log being peeled for travel along a fixed axis to move the log concentrically through a peeling drum. Each conveying apparatus engages the log on opposite sides of a peeler drum assembly to constitute an infeed and an outfeed for said assembly. Continuous recirculating members of each conveyor apparatus support the log for longitudinal travel along its major axis coaxial with the projected horizontal axis of the peeler drum for uniform presentation of each log to and removal from the drum regardless of changing log diameters. Simultaneously with the operation of the continuous log supporting members is the operation of powered hold down rolls located above and along the passing log confining same against axial displacement or tipping.

A lower, vertically adjustable conveyor frame carries the log supporting members while an upper frame, also vertically adjustable, carries the hold down rolls. The hold down frame additionally moves about a horizontal axis thereby compensating for any difference in log diameter at the contact point of the hold down rolls. Associated with the upper and lower movable frames are upper and lower pairs of hydraulic cylinders in series communication with a source of fluid pressure to impart equal but opposite vertical movement to the upper and lower frames toward and away from a projected axis of the cutter cylinder to assure positive driving engagement of the frame carried components with a log while constraining same for concentric travel along said axis through the cutter.

The upper and lower frames additionally include hydraulic motors for powering log contacting members. During initial log engagement said upper and lower frame members are urged by their respective cylinders toward the cutter axis to accurately guide the log into the cutter cylinder with continued log passage resulting in the gradual, uniform closing movement of the upper and lower frames as log diameter decreases. Identical apparatuses are located adjacent the opposite machine ends for jointly propelling the log past the centrally disposed cutter cylinder as above mentioned.

A peeler drum assembly, located on the machine frame intermediate the infeed and outfeed apparatuses, includes a fabricated drum structure which serves to mount a circular tank structure supplying hydraulic components. Pumps on said drum structure are powered by means journalled on the drum structure and powered in a direction opposite to that of drum rotation. Hydraulic components closely associated with multiple cutter head assemblies are powered by said pumps. Additionally, the cutter head assemblies are subject at all times to an operator's control to assure desired peeling action. The drum assembly mounts an antenna and a receiver unit whereby radio transmitted signals ultimately regulate hydraulic components thereby overcoming obstacles previously encountered in the use of slip rings intermediate moving and stationary components.

Important objects of the present invention include: the provision of a log peeling machine having separate log propelling apparatuses moving a log rapidly and concentrically along the fixed axis of a peeler drum assembly; the provision of log propelling apparatuses having cooperating pairs of positionable frames disposed above and below a passing log which frames move equally along vertical vectors but in opposite directions to accomplish driving contact of frame carried powered means on the frames with the log while avoiding displacement of the log axis; the provision of powered means on each of the upper and lower frames capable of advancing the log, stopping same or reversing log travel; the provision of cooperating upper and lower pairs of hydraulic cylinders at all times biasing frame mounted components against the log to constrain same for precise, axial travel; the provision of a peeler drum assembly through which logs pass in a concentric manner along a stationary axis; the provision of a peeler drum assembly having radio receiver components and associated circuitry thereon to enable the control of drum assembly components by radio transmitted signals thereby obviating the use of slip ring type conductors which are highly susceptible to rapid wear and contamination by wood particles; the provision of a peeler drum assembly having an integral hydraulic system not dependent on an outside fluid source; and the provision of a peeler drum assembly having multiple cutter head assemblies, each of which includes a powered rotating cutter block acting on the log surface which block is positionable during a peeling operation toward and away from the log, with the cutter block axis being additionally adjustable relative to the log surface to affect desired peeling action along a helical path.

BRIEF DESCRIPTION OF THE DRAWINGS

In the accompanying drawings:

FIG. 1 is a side elevational view of a log peeling machine incorporating the present invention, FIG. 2 is an end elevational view of a log hold down assembly taken along line 2—2 of FIG. 1, FIG. 3 is an end elevational view of a log conveyor assembly taken along line 3—3 of FIG. 1, FIG. 4 is a horizontal plan view of the log conveyor assembly taken along line 4—4 of FIG. 1, FIG. 5 is a bottom plan view of the hold down assembly taken along line 5—5 of FIG. 1, FIG. 6 is a hydraulic schematic for hydraulic components associated with the conveyor assembly and the hold down assembly, FIG. 7 is a hydraulic schematic of a fluid circuit associated with hydraulic motors carried by the log conveyor and hold down assemblies, FIG. 11 is a sectional elevational view of drum structure taken along line 11—11 of FIG. 8, FIG. 12 is an elevational view of a cutter head assembly taken along line 12—12 of FIG. 11, FIG. 13 is a hydraulic schematic of a peeler drum assembly hydraulic system.

DETAILED DESCRIPTION OF THE PREFERRED EMBODIMENT

Figure 8:
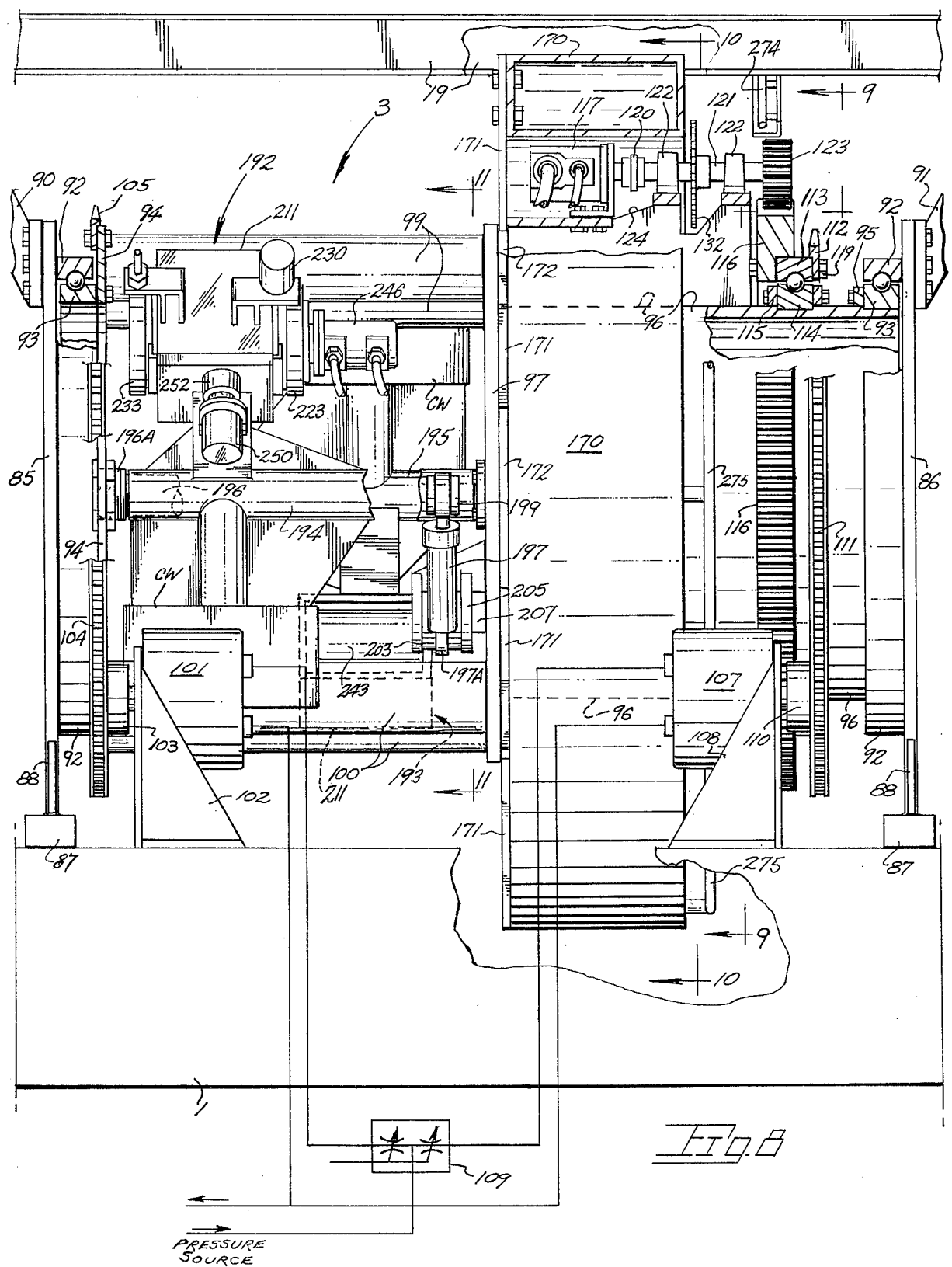
FIG. 8 is a side elevational view of the peeler drum assembly with fragments broken away for illustrative purposes.

With continuing reference to the accompanying drawings wherein applied reference numerals indicate parts similarly identified in the following specification, the reference numeral 1 indicates a machine frame comprising beams of welded plate construction supported by leg structures 2. Centrally supported by said beams is a rotatable peeler drum assembly indicated generally at 3 shown in dashed outline form. The peeler assembly includes cutter heads mounted within an annular drum structure which heads orbit at regulated speeds about an axis Y and about the passing log to accomplish peeling.

Indicated generally at 4 and 5 are identical, log conveying apparatuses which may be termed an infeed and an outfeed, for cooperating advancement of a log into, through and out of peeler assembly 3. The following structural description of the infeed apparatus is equally applicable to the outfeed apparatus with like components of the latter identified on the drawings by prime reference numerals. Separate operator controls are provided for each apparatus as later explained.

The infeed apparatus is supported by a tower structure integral with machine frame 1 and comprising pairs of vertical members 6 and 7 secured to the frame and specifically frame crossmembers at 8. Additional tower components include closely spaced apart pairs of uprights 9 welded to frame 1 and extending therebelow to constitute legs 2. The spaced apart uprights 9 serve primarily as guides for the vertical travel of later described movable frames. A top plate 10 completes the tower structure. A central beam structure 19 interconnects the two tower structures for purposes of reinforcing same.

A log conveyor assembly is indicated generally at 12 and includes laterally spaced beams 13 (best viewed in FIG. 4) having supports 14 spaced along opposite edges on which a beam connector plate 15 is mounted all constituting a conveyor frame. The upper surface of said plate serves to mount a lengthwise extending, friction reducing polymeric sheet 16 which slidably supports the upper run of recirculating conveyor members 17. Said members are of arcuate configuration formed on a radius of approximately 18 inches. Conveyor chain sprockets 18 are carried by shafts 20 journalled in beam mounted bearings 21. A beam supported hydraulic motor 22 drives shaft 20 through a planetary gearbox 23 to impart arrow indicated travel (FIG. 1) to the upper run of log conveyor members 17. Each member 17 includes chain link components entrained about sprockets 18 and which carry the log supporting arcuate, rubber pads 17.

For purposes of positioning log conveyor assembly 12, a lower pair of pressure responsive hydraulic cylinders 28 are each attached by gusset reinforced mounting plates 29 to beams 13 of the log conveyor assembly. A fixed piston rod 30 is pinned at 31. Each cylinder 28 may be termed a double rod cylinder moving the conveyor frame upwardly when pressured at its upper end elevating conveyor assembly 12 and conversely lowering when pressurized at its lower end below a static piston on rod 30.

For guiding horizontal log conveyor frame 13 through its vertical range of travel I provide beam mounted angle plates 32 adjacent each end of the parallel beams 13, said plates having replaceable skid plates 32A affixed thereto which slide along tower members 6 and 7 to constrain frame 13 into a horizontal position. An additional friction reducing plate 33 is disposed intermediate the outside of each beam at its center for sliding contact along the inner surfaces of upright members 9. From the above it will be seen that conveyor assembly 12, during vertical movement, remains horizontal. Admission of hydraulic fluid into the upper end of cylinders 28 raises conveyor assembly 12 while lowering of the assembly is by fluid discharge from the upper end of the frame mounted cylinders. A frame mounted block 34 carries pads 34A.

A log hold down assembly is indicated generally at 35 and comprises (as best viewed in FIG. 5) a pair of parallel frame members 36 interconnected by crossmembers 37 with each frame member having aligned pairs of bearings 38 within which are journalled roll carrying shafts 39-40. Each shaft 39-40 carries a double tapered roll 41-42 with shaft mounted sprockets at 43-44 imparting rotary motion to each roll by means of a chain drive 47. A hydraulic motor 45 and planetary drive 46 mounted on one of the hold down beams 36 drives roll shaft 40 and remaining hold down shaft 39 by means of chain drive 47.

The hold down assembly pivots about a horizontal axis indicated at X to permit the hold down frame and rolls 41-42 to pivotally adjust or swing to accommodate different log diameters. Such pivotal movement is about the axis of pivot bolts 48 extending through each frame member 36 and partially through a guide assembly 50 entrained for travel along upright members 9. The opposing inner surfaces of each member 9 confine the guide assembly which includes an interposed block having friction plates 51 in sliding contact with tower members 9. Positioning hold down assembly 35 are cylinders 52 adapted for vertical travel along a fixed piston rod 53 pinned at their lower ends to clevises carried by the stationary upright members 9 and gusseted to machine frame 1. Accordingly, pressurized fluid into the upper end of cylinders 52 will cause hold down assembly 35 to rise to an open, log receiving position whereat both hold down rolls are elevated away from log conveyor assembly 12 and away from a projected horizontal axis of peeler drum assembly 3. Vertical forces are imparted to the midpoint of the hold down assembly through cylinder mounting plate 54 and bosses 54A with the rolls 41-42 being self adjustable about a horizontal axis X of bolts 48 to accommodate any variance in log diameter between roll contact points.

With attention to the hydraulic schematic in FIG. 6, a motor driven pump at 55 charges an accumulator 56 to provide a uniform pressure to a closed center, four-way tandem cross-over valve 57 via line 58. An unloader valve 59 serves to return pump output, at a low pressure, to a reservoir 67. For initial positioning of both the hold down assembly 35 and subjacent conveyor assembly 12 to a log receiving position, fluid is directed via solenoid actuated directional valve 57 through line 60 and branch lines 62 to the upper ends of hold down cylinders 52. As the pistons and rods within double acting cylinders 52 are fixed, upward movement will be imparted to the cylinders and hence to hold down frame 36 thereby elevating said frame and hold down rolls 41-42 thereon. Simultaneously, fluid is exhausted from the diminishing cylinder area below the fixed pistons of the double rod cylinders which fluid is directed via lines 63 to the lower ends of log conveyor assembly cylinders 28. Such charging of the last mentioned cylinders below their fixed pistons results in cylinders 28 moving downwardly along with attached conveyor frame 13 to move said conveyor frame, simultaneous with the opposite movement of the hold down frame, downwardly away from the projected centerline of peeler drum assembly 3. Fluid exhausted from cylinders 28 returns to a reservoir 67 via later described components.

Upon the butt end of the log to be peeled projecting between the conveyor and hold down frames from a delivery conveyor at C, the spool of directional valve 57 is shifted to oppositely pressurize cylinders 28 and 52 with fluid pressure being routed through fluid line 64, a pressure compensated flow divider valve 61 and branch lines 64A to the upper ends of conveyor cylinders 28 causing elevation of said cylinders and attached conveyor frame 13 thereby positioning recirculating support members 17 into supporting engagement with the log. Conjointly with the upward positioning of the log conveying assembly 12, hold down assembly 35 is powered downwardly by fluid exhausted from the lower ends of cylinders 28, via lines 63, to the lower ends of cylinders 52 to pressurize the cylinder area below their fixed pistons. The cylinders 28 and 52 are of equal displacement resulting in travel toward and away from the log (and the projected centerline of cutter apparatus 3) at identical vertical rates. Pressure compensated flow divider valve 61 assures against uneven fluid displacement from the cylinders thereby avoiding any canting of the frames and binding thereof against tower components 6 and 7. A second directional valve at 57' is also in communication with pump 54 and reservoir 67 for the purpose of controlling like hydraulic components associated with the outfeed conveyor apparatus 5.

In the motor schematic provided in FIG. 7, a variable displacement pump 66, preferably of the axial piston type, pressurizes fluid from a source 67 with the pressurized fluid being directed through a gear type flow divider 68 and thence via line 69 to a directional valve 70, a suitable valve being a four-way tandem crossover valve having an open center. A pump motor is indicated at 71. Flow divider 68 additionally apportions a flow to a second directional valve at 70' also operator controlled for directing pressurized fluid to conveyor and hold down assemblies associated with outfeed conveyor apparatus 5. With attention to directional valve 70, a line 72 directs fluid pressure to a pressure compensated flow divider valve 73 which equally apportions the hydraulic flow to lines 77, 78 serving conveyor motor 22 and hold down motor 45. Uniform rotational speeds of the motors are realized regardless of the degree of frictional engagement between their respective log engaging components to avoid overspeeding of the motor having the lightest load. For reversing the direction of motors 45 and 22, valve 70 is actuated to pressurize a fluid line at 76 and branches 74, 75. Flow divider valve 73 serves in this instance as a flow combiner valve directing fluid return flow into line 72 for fluid return to directional valve 70. Fluid return from valve 70 is via reservoir return line 80.

In operation, the log L to be peeled is delivered to log conveying apparatus 4 of the peeling machine by conveyor means C which includes vertically adjustable components for log positioning. Upon the log projecting from conveyor C into the area intermediate conveyor assembly 12 and hold down assembly 35, the peeling machine operator will actuate valve 57 thereby imparting closing movement to both of said assemblies towards axis Y representing the projected axis of a cutter drum of peeler drum assembly 3. The leading end of the log is displaced upwardly (assuming the log is less than maximum diameter) until the axis of log L is concentric with axis Y. Certain components of conveyor C are also moved upwardly to support the unseen remainder of the log in a horizontal manner. The pairs of pressurized hydraulic cylinders 28 and 52 force conveyor assembly 12 and hold down assembly 35 towards one another to hold the log in axial alignment with peeler drum assembly 3. Subsequent actuation of valve 70 by the machine operator energizes motors 22 and 45 to initiate travel of conveyor means 17 and rotation of hold down rolls 41-42 to propel the log into peeler drum assembly 3. Because of normal seal leakage in cylinders 28 and 52, it is necessary, from time to time, to add hydraulic fluid under pressure, via fittings in lines 63, to maintain synchronous movement of the upper and lower assemblies relative to axis y.

Upon passage of the forward end of Log L through peeler drum assembly 3 and into the area intermediate conveyor assembly 12' and hold down assembly 35', constituting an outfeed for the peeler drum assembly, the machine operator will repeat the above described position of the assemblies by actuation of valves 57' and 70' with flow divider 68 in circuit therewith assuring uniform motor speeds to effect desired linear travel of the log. The log is discharged from outfeed conveying apparatus 5 onto off-loading rolls not shown. The present peeling machine is capable of peeling logs ranging from 6 inches in diameter to 36 inches in diameter and up to 120 feet in length.

PEELER DRUM ASSEMBLY

With attention to FIGS. 1 and 8, a rotating peeler drum assembly is aupported on the parallel beams 1 of the main frame intermediate infeed and outfeed log conveyor apparatuses 4 and 5. End mounting plates at 85 and 86 define aligned, large diameter openings for the passage of a log with the lower corners of each plate supported by beam affixed pads 87 laterally braced at 88. The upper corners of each end mounting plate are braced by inwardly directed braces 90-91. Each of said braces terminates upwardly in securement to central frame structure 19 of the machine.

Rotatably mounted intermediate end plates 85-86 is a welded, annular drum structure 96. Outer bearing races at 92, mounted on said end plates, cooperate with inner races at 93 bolted to annular drum components. With attention to the left hand or infeed side of FIG. 8, a peripheral drum flange 94 mounts bearing race 93 while the remaining inner bearing race 93 is bolted to a ring 95 which, in turn, is carried by drum structure 96. Said welded drum structure additionally includes second peripheral flange 97 extending radially from the drum structure. First mentioned peripheral flange 94 is supported at the infeed end of drum assembly 3 by diametrically opposed pairs of spacer tubes at 99 and 100. From the foregoing it will be seen that drum structure 96 includes both a cylindrical walled portion as well as a forward open portion.

Imparting rotation to the above described drum structure is a hydraulic motor 101 mounted on the machine frame by a bracket 102 and having a driving sprocket 103 driving a roller chain 104 and a large driven sprocket 105 bolted at 106 to drum flange 94. Accordingly the welded drum structure 96 rotates within bearing races 92 in one direction opposite to the direction of rotation of a following described face gear journalled on the drum structure.

A second hydraulic motor at 107, bracket mounted at 108 to the machine frame, drives a sprocket 110, a roller chain 111 and an annular sprocket 112. Said sprocket is secured to the outer race 113 of a bearing including an inner race 114 secured intermediate mounting rings 115 on drum structure 96. A face gear 116 is shouldered to seat upon outer bearing race 113 with bolt assemblies at 119 securing sprocket 112, race 113 and face gear 116. Accordingly, motor 107 drives face gear 116 in counterrotation to welded drum structure 96 earlier described. Gear 116 serves to drive, via pinion gears 123 and 125, diametrically disposed vane pumps at 117 and 118 (FIG. 9) which power hydraulic motors of infeed and outfeed cutter head assemblies later described. With attention to FIG. 9, drum cylinder 96 serves to mount numerous mechanical, electrical and hydraulic components serving the later described cutter head assemblies. Motors 101 and 107 are supplied from a common pressure source through a variable flow divider at 109, both discharge ports of which may be regulated enabling the changing of drum and face gear speeds with a single operator control. As larger diameter poles require slower drum speeds in order to maintain a nominal rate of feed of the cutter assemblies moving about the log circumference, the linear speed of large diameter logs will be less than the speed of a lesser sized log. On smaller logs higher drum speeds are possible while the same cutter feed rate is maintained. From this it will be seen that a pole of 15-inch diameter could be advanced through the drum at twice the linear speed as that for a pole of 30-inch diameter.

The speed of drum rotation is operator controlled by varying the amount of hydraulic fluid directed to drum assembly drive motor 101 by changing position of the spool in pressure compensated, infinitely variable, flow divider 109. Fluid not directed to drum assembly drive motor 101 is, accordingly, automatically directed to motor 107 thus a constant input speed to pinion gears 123 and 125 is maintained assuring a constant output from all pumps mounted upon the revolving drum assembly regardless of changes in drum assembly R.P.M.,. This feature assures a constant, optimum rotary speed of later described, hydraulically powered, cutter head blocks such speed being essential to providing a smooth finished surface on the pole. With this arrangement, drum assembly rotational speed may be varied from 0 to approximately 84 R.P.M. (to best suit log diameter) without varying the rotary speed of the cutter head blocks.

Hydraulic pumps 117 and 118 are typically coupled as at 120 (FIG. 8) to shafts 121 and 126 journalled within pairs of bearings 112, 128 within the outer ends of the shaft receiving pinion gears 123, 125 in mesh with face gear 116. Suitable brackets 124, 127 on drum cylinder 96 support each pump and associated bearings. By reason of the counterrotation of drum structure 96 and hydraulic pumps 117, 118 from face gear 116, suitable pump shaft speed and output is achieved with low speed rotation of the counterrotating components.

Each of the aforementioned pumps 117 and 118 is associated with a secondary hydraulic pump, respectively, at 130-131, the secondary pumps being driven by power take-off arrangements from shafts 121, 126. At first such arrangement includes a sprocket 132 on shaft 121, a roller chain 133, a driven sprocket 134, a shaft 135 journalled in bearings 136 all supported by bracket means 137. Shaft 135 is coupled to secondary hydraulic pump 130.

The remaining secondary hydraulic pump 131 is driven by a similar power take-off arrangement including a sprocket 140 on shaft 126, a roller chain 141, a driven sprocket 142, a shaft 143 journalled in bearings 144 all supported by a bracket 145 on drum structure 96. A driving pulley 146 on shaft 143 along with a V-belt 147 and a driven pulley 148 serve to drive an alternator 150 providing a 12 volt source of power for system components. An adjustable alternator mount is indicated at 151.

Drum structure 96 mounts additional hydraulic and electrical components such including solenoid actuated valves 152, 153, 154 155, 156 and 157; a battery box 158; oil filters 161 and 162; hydraulic fluid return manifold 163, 164; a 12 volt alternator regulator 165 and valve 166 all later elaborated upon. A radio control components box is indicated at 160.

Figure 10:
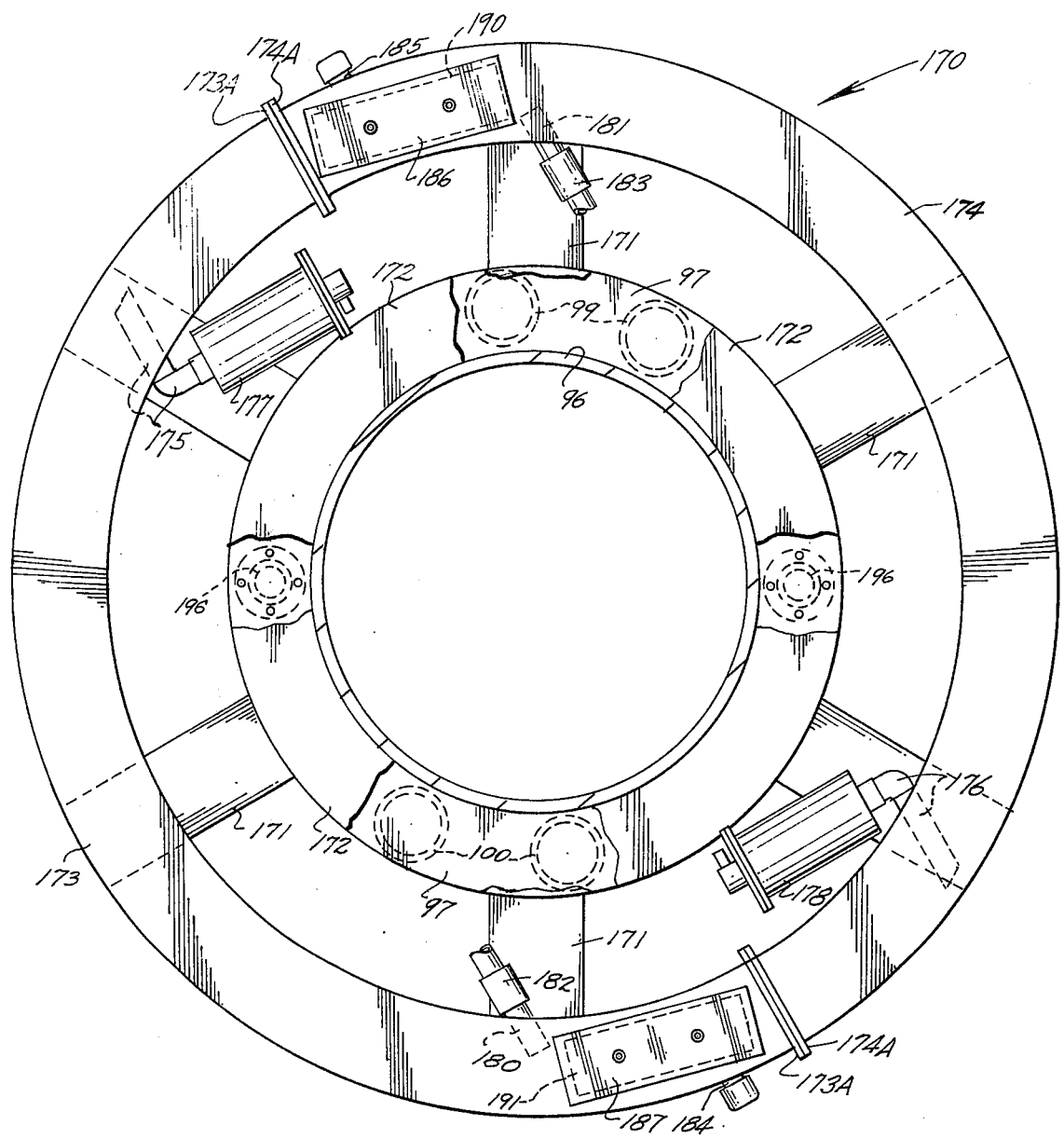
FIG. 10 is a sectional elevational view of circular tank structure taken along line 10—10 of FIG. 8 with drum mounted hydraulic components removed.

As best viewed in FIG. 10, an annular reservoir or tank structure is indicated generally at 170. Said tank structure is supported in radial spaced relationship to drum structure 96 by means of tank mounting plates 171 spaced about and welded at their inner ends to a ring 172 welded to cylinder 96. Circular tank structure 170 is of segmented construction with individual semicircular tanks at 173-174 closed by interconnected end plates 173A-174A. Outlets at 175, 176 direct fluid past strainers at 177, 178. Oil returns at 180 and 181 are provided with check valves 182, 183. Filler inlets are indicated at 184 and 185. Tank cover plates at 186 and 187 serve to mount bonded, nylon reinforced neoprene rubber bladders 190 and 191 each pressurized at 5 PSI to compensate for volume fluctuations in tank volume resulting from temperature changes and to provide a constant 5 PSI tank fluid pressure to assist feeding the hydraulic pumps. Each plate 186 and 187 is provided with pairs of opposite flow check valves to permit pressurization of each bladder to 5 PSI at the start of each shift with excessive bladder pressure being bled off by the remaining check valve set at 5 PSI.

With reference to FIGS. 8 and 11, cutter head assemblies at 192 and 193, termed infeed and outfeed by reason of their relationship to a passing log, are swingably supported on diametrically opposed mounting tubes 194 and 195. Tube support members at 196 extend intermediate drum flanges 94 and 97 to suitably journal said tubes permitting partial rotation of same about their respective horizontal axes. Tube support members 196 terminate at one end within an internally and externally threaded bolt 196A.

Imparting in-out arcuate travel to each cutter head assembly about the axis of each mounting tube are hydraulic cylinders at 197 and 198 with the rod end of each coupled to its respective mounting tube by pairs of arms 199 and 200 and pivot pins 201, 202. Similarly, the opposite or blind end of each cylinder is swingably mounted by means of a tang as at 197A, pins 203, 204, within clevises 205, 206 on drum flange brackets 207, 208. Counterweights at CW for each cutter head assembly offset both the effects of the centrifugal force and gravity exerted on the orbiting cutter head assemblies. Counterweight support arms are gusseted and terminate in rigid securement to the cutter head mounting tubes 194 and 195.

The following description of a single cutter head assembly is applicable to both assemblies 192 and 193 as they are identical with the exception of a reversal of motor and shaft components for the purpose of compact disposition of the cutter head assemblies between flanges 94 and 97 of drum structure 96. As viewed in FIG. 12, cutter head housing 211 is of box-like construction having a top wall 212, side walls 213, and 214 and end walls 215 and 216. For servicing of internal cutter head parts, the walls are preferably in bolted attachment (not shown) to one another.

To each end wall 215 and 216 are bolted pairs of guide rails 217 and 218. Slidably confined between each pair of guide rails is a depth of cut control plate 220 and 221 held in sliding abutment by said rails against housing end walls 215 and 216. Depth control plate 220 includes an annular portion 221, which serves to carry a set of friction reducing bearing rings 222 on which is journalled a wheel and tire assembly 223. Said annular portion 221 is threaded to receive a locking ring 225 locked by a bolt 226. Accordingly the outfeed end of cutter head housing 211 is spaced from a log surface by wheel assembly 223.

The upper end of depth control plate 220 (as viewed in FIG. 12) is provided with a bracket 227 within which the rod end 228 of a hydraulic, depth of cut cylinder 230 is secured by a bolt 231. Cylinder 230 is supported above the cutter head housing by a weldment 232. From the foregoing, it will be evident that actuation of double-acting, depth control cylinder 230 results in wheel assembly 223 moving along housing end wall 215 to space the lower edge thereof (and a later described cutter head blade) relative to the exterior surface of a log being peeled.

The remaining or infeed end of cutter head housing 211 is supported by a second wheel assembly mounted on aforementioned depth control plate 221. Said plate is confined within guide rails 218 and defines a bore 221A within which is secured a spindle 231 which projects outwardly from depth control plate 221 and is provided with friction resistant rings 232 to rotatably mount a wheel and tire assembly 233. Said spindle receives a nut element 235 with a lock bolt 236.

The upper end of depth control plate 221 is provided with a bracket 237 within which one end 238A of a manually adjustable depth control rod 240 is mounted. Nut elements 241 enable adjustment of said rod and hence plate 221. Accordingly, the relationship of the infeed end of cutter head housing 211 and the later described cutter head block with a log surface may be set for the desired peeling depth. A bracket 242 supports adjustment rod 240. While the wheel assemblies space the cutter head housing by being in rolling contact with the log, it will be apreciated that wheel assembly 223, as it is on the outfeed side of the cutter block, will ride on a reduced log circumference devoid of bark and knots. Precise adjustment of depth control plate 220 by remote actuation of cylinder 230, as later described, prevent helical scoring of the peeled log.

With continuing attention to FIGS. 11 and 12, cutter head housing 211 is free to rotate about an axis at Z for the purpose of uniform wheel contact along the slightly tapering log exterior. Such adaptation of the housing to the somewhat inclined surface of a log moving axially therepast is achieved by means of a shaft 249 locked at a shouldered end by a nut 249A to sidewall 213 of said housing. Said shaft constitutes a spindle which is journalled within an outer bearing race retainer 247 all housed within a cutter head moutning tube 248 which is in welded securement at its opposite end to cutter head assembly mounting tube 194 while remaining cutter head mounting tube is secured to the remaining mounting tube 195. Each cutter head mounting tube serves additionally to mount a cutter head housing lock comprising double-acting hydraulic locking cylinder 250 supported at its rod end by a bracket 251. The piston rod of said cylinder terminates in a conical end which, upon rod extension, seats within a socket 252 of corresponding shape secured to the cutter head housing. Radical movement of the housing about axis Z is thereby avoided during entry and departure of log ends below the cutter head assemblies.

Within cutter head housing 211 is journalled a cutter head block 243 of cylindrical shape having blade means 244 mounted therealong. A cutter block shaft 245 carries said block and is powered by a hydraulic motor 246. A mounting flange 246A of the motor is attached to a coupling housing 247 secured at its inner end to end wall 25 of the cutter head housing. The housing end walls 215, 216 serve to mount, on their inner surfaces, bearing retainer caps at 250 and 251 within which outer bearing races of bearings 252 and 253 are confined. Suitable seals (not shown) are incorporated into the bearing retainer caps 250A and 251A. A jam unit 254 on shaft 245 retains the shaft and bearings against axial displacement.

Peeler drum assembly operation is initiated with a divided, pressurized flow of fluid being provided to frame mounted hydraulic motors 101 and 107 from a source, the former motor powering peeler drum structure 96 supported within end mounted bearing races 92 while motor 107, of like displacement, powers face gear 116 in an opposite direction of rotation. Accordingly pinions 123 and 125 orbit about the counterrotating face gear to drive hydraulic pumps 117 and 118 at a desired RPM. With attention to the hydraulic schematic, pump 117 draws fluid via strainer 177, and delivers a pressurized flow to a hydraulic motor 246 of the infeed cutter head assembly with the reservoir return flow routed through collector manifold 163 and filter 161. Similarly, pump 118 draws through strainer 178 and powers a hydraulic motor 119 powering the outfeed cutter head assembly. A reservoir return flow is via fluid manifold 164 and filter 162. Pilot operated relief valves are indicated at 256 and 257.

Secondary hydraulic pump 130, driven via a power take-off arrangement from shaft 121, delivers a pressure flow to a pair of four-way, tandem center, solenoid actuated valves 152, 153 each of which is in fluid circuit with depth of cut cylinders 230 on the infeed and outfeed cutter head assemblies 192 and 193. The fluid flows to and from each depth of cut cylinder pass through pairs of pressure compensated flow control valves at 258 and 259. A tank return flow from said solenoid valves is routed through manifold 163. A pilot operated relief valve is indicated at 261.

A power take-off arrangement from shaft 126 drives the other secondary hydraulic pump 131 which serves a first pair of four-way solenoid actuated valves 154, 155 associated with in-out hydraulic cylinders 197, 198 which, as earlier noted, position the infeed and outfeed cutter head assemblies toward and away from the coaxial peeler drum and log axes. Accumulators at 262 and 263 assure an adequate, rapid fluid pressure supply for inout cylinders 197–198 to maintain the cutter head assemblies in riding contact with the log surface regardless of it being out of round. Cross port relief valves at 264 and 265 unload the blind end of in-out cylinders 197, 198 during operation where the log section is elliptical resulting in piston rod oscillation.

Secondary hydraulic pump 131 additionally supplies four-way, solenoid actuated valves 156, 157 which control fluid flow to cutter head housing lock cylinders at 250 to lock the housings against movement about axis Z as the log moves past each housing.

Figure 14:
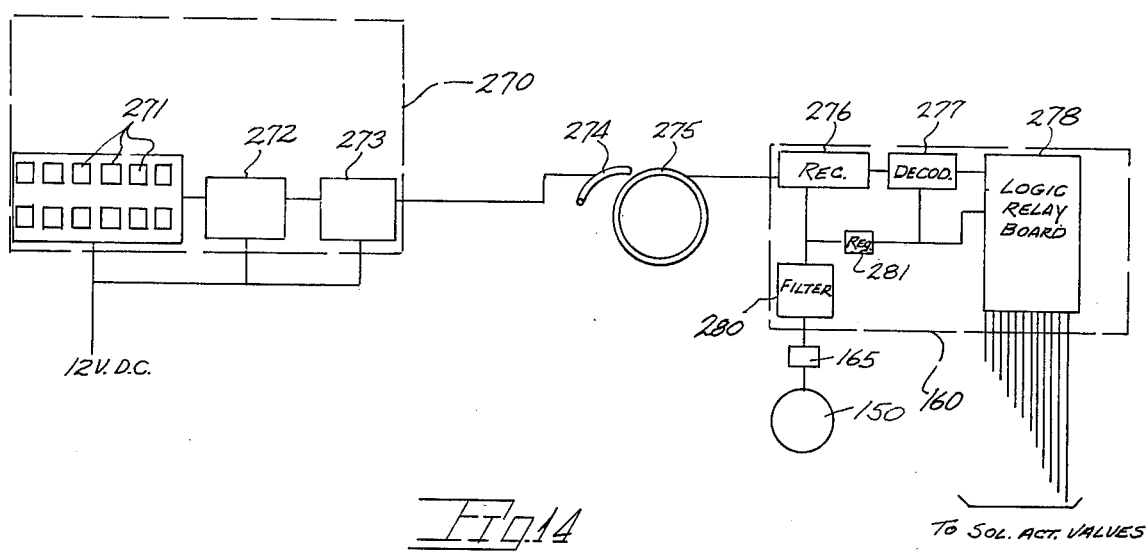
FIG. 14 is a block diagram of peeler drum radio control components.

A peeler drum assembly control system schematic including electro-mechanical components is shown in FIG. 14 wherein a console 270, located at the operator's station, includes 12 function switches 271 constituting a standard tone pad. Each switch is in circuit with a tone encoder 272 which, in turn, is in circuit with a transmitter unit 273. A twelve volt DC power source energizes console components in response to operator actuation of the tone pad. Encoded signals are transmitted from a stationary, frame mounted antenna 274 which signals are received by a rotating, circular antenna 275 suitably mounted on and insulated from circular reservoir structure 170. Encoded signals, received by antenna 275, are provided to a receiver 276 and thence a decoder 277 mounted on drum structure 96. Inputs to a combination logic-relay board include momentary inputs direct from the decoder with gate circuits on said logic-relay board enabling both momentary and latching actuation of the aforementioned solenoid valves. Solenoid valves 152, 153 controlling fluid flow to the depth of cut cylinders 230 of each cutter head assembly are actuated in a momentary manner while inputs to relays controlling solenoid valves 154 through 157 are latched by said gate circuits.

A power source for the drum mounted electrical components is provided by alternator 150 the output of which is regulated by a voltage regulator 165 and passes through a filter 280. A voltage regulator 281 drops the voltage to approximately 5 volts for certain receiver components.

Figure 9:
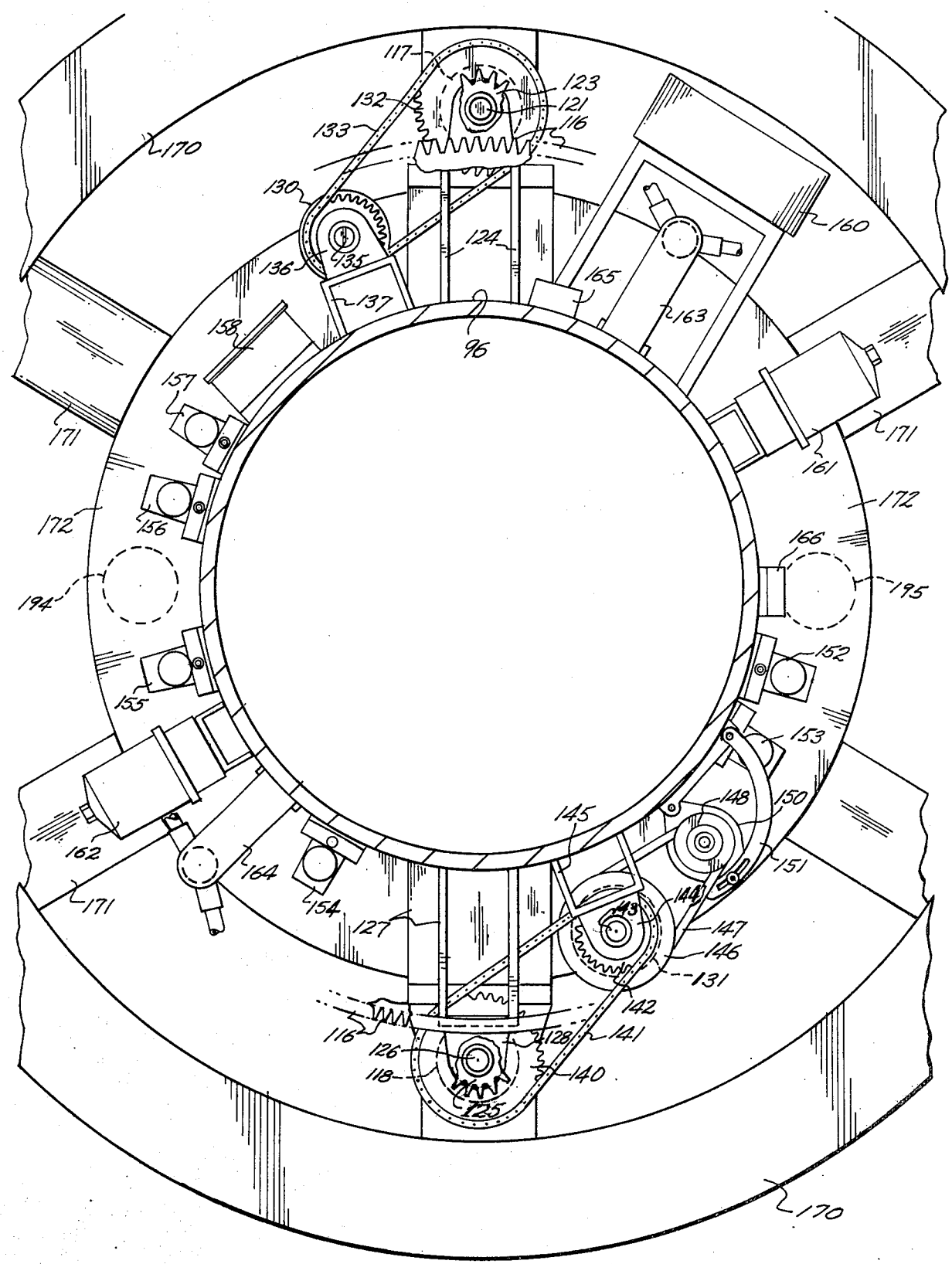
FIG. 9 is a sectional elevational view of an annular drum structure taken along irregular line 9—9 of FIG. 8.

The electro-mechanical and radio control system components on the peeler drum assembly are mounted on the outer surface of drum structure 96, inwardly of circular tank structure 170 as best viewed in FIG. 9.

As a log to be peeled is advanced toward the peeler drum assembly by the log conveying apparatuses 4 and 5, as earlier described, the machine operator will initially retract the cutter head assemblies 192, 193 until the log butt is located so as to support the wheel assemblies of said cutter head assemblies upon the latter being repositioned inwardly. In-out cylinder 197–198 are pressurized to retain the orbiting cutter head assemblies in rolling contact in a helical path about the moving log. Housing locking cylinders 250 are actuated to retract their piston rod ends from sockets 252 to release each housing permitting movement about axis Z for full riding contact of the housing wheel assemblies on the log surface. For removal of the log bark the leading wheel assembly 233 of infeed cutter head assembly will be previously adjusted manually while the trailing wheel assembly 223 of said cutter head assembly is controlled during log peeling by incremental adjustment of depth cylinder 230. The wheels of outfeed cutter head assembly 193 are similarly adjusted to provide a smooth finished cambium surface. The operator closely monitors the peeled log surface to assure the desired finish. Upon the log end passing the cutter head assemblies, housing lock cylinders are actuated to extend their piston rod ends into locking engagement with the housings to support same against inward tipping as the log departs the leading wheel of said housing assembly thereby preventing a tapered log end.

While I have shown but one embodiment of the invention it will be apparent to those skilled in the art that the invention may be embodied still otherwise without departing from the spirit and scope of the invention.

I claim:

1. In a log peeling machine having a fixed axis peeler drum assembly supported on an elongate machine frame for the removal of the outer log surface, the improvement comprising a log conveying apparatus disposed intermediate upright members of the machine frame for linear passage of a log along an axis coincident with the fixed axis of said peeler drum assembly, said conveyor apparatus comprising, a conveyor assembly disposed below the log being peeled, said assembly comprising,
a horizontal conveyor frame adapted for vertical travel relative to the machine frame,
a continuous log conveyor having upper and lower runs entrained about said frame for supported travel of the log along the conveyor frame,
a motor on said frame powering said log conveyor,
hydraulic means acting on said frame to move same toward and away from the projected axis of the peeler drum assembly, a log hold down assembly supported by the peeling machine and disposed above the log path, said hold down assembly comprising,
a hold down frame,
rotatable means mounted in a spaced apart manner on said frame and adapted to bear in a spaced apart manner upon a log being peeled confining same against the conveyor assembly,
a motor carried by said frame in driving connection with said rotatable means,
guide means slidably entrained on said upright members of the machine frame for travel toward and away from the projected axis of the peeler drum assembly, pivot means interconnecting the hold down frame and said guide means permitting limited rotational movement of the frame about the horizontal axis of said pivot means permitting desired contact of said rotatable means with the log regardless of varying log diameters, hydraulic means acting on said hold down frame to vertically position same and to urge said rotatable means thereon into forceful log contact, and said conveyor assembly and hold down frame hydraulic means comprising cylinders of like displacement and in series communication with one another and with an operator controlled source of pressure so as to impart synchronous closing movement to said conveyor and hold down frames moving same toward the projected axis of the peeler drum assembly to confine a log for passage along said axis through said peeler drum assembly in a precise manner.

2. The invention as claimed in claim 1 wherein said conveyor frame includes means slidably engaging upright frame members of the log peeling machine to retain said conveyor frame horizontal throughout its range of movement.

3. The invention as claimed in claim 1 wherein said log conveyor includes log engaging members each of arcuate configuration joined in a continuous manner, said conveyor frame including friction reducing means supporting the upper run of said log conveyor.

4. The invention as claimed in claim 1 wherein said rotatable means of the log hold down assembly comprises powered rolls oppositely disposed from said pivot means.

5. The invention as claimed in claim 1 wherein each of said cylinders are of the double rod type having a fixed piston rod and piston with the cylinders coupled to said frames, each of said cylinders having ports adjacent their opposite ends.

6. The invention as claimed in claim 1 additionally including a fluid circuit having pressure compensated flow divider means therein apportioning the fluid flow to the conveyor assembly motor and hold down assembly motor to assure predetermined motor speeds.

7. A log peeling machine having infeed and outfeed log conveying apparatuses and rotatable peeler drum assembly all supported on an elongate machine frame for the removal of the outer log surface during the manufacture of a pole, said log peeling machine comprising in combination, log infeed and log outfeed conveying apparatuses oppositely disposed on the machine frame from the peeler drum assembly, each of said conveying apparatuses comprising, a conveyor assembly disposed below the log being peeled, said assembly comprising, a horizontal conveyor frame adapted for vertical travel relative to the machine frame, a continuous log conveyor including upper and lower runs entrained about said frame for supported travel of the log along the conveyor frame, a motor on said frame powering said log conveyor, hydraulic means acting on said frame to move same toward and away from a projected axis of the peeler drum assembly, a log hold down assembly supported by the peeling machine and disposed above the log path, said hold down assembly comprising, a hold down frame, rotatable means mounted in a spaced apart manner on said frame and adapted to bear in a spaced apart manner upon a log being peeled confining same against the conveyor assembly, a motor carried by said frame in driving connection with said rotatable means, guide means slidably entrained on said upright members of the machine frame for travel toward and away from the projected axis of the peeler drum assembly, pivot means interconnecting the hold down frame and said guide means permitting limited rotational movement of the frame about the horizontal axis of said pivot means permitting desired contact of said rotatable means with the log regardless of varying log diameters, hydraulic means acting on said hold down frame to vertically position same and to urge said rotatable means thereon into forceful log contact, said conveyor assembly hydraulic means and hold down frame hydraulic means comprising cylinders of like displacement and in series communication with one another and with an operator controlled source of pressure so as to impart synchronous closing movement to said conveyor and hold down frames moving same toward the projected axis of the peeler drum assembly to confine a log for passage along said axis through said peeler drum assembly in a precise manner, and said peeler drum assembly comprising, a drum structure rotatably supported by the machine frame and adapted for powered rotation in one direction about a horizontal axis constituting the peeler drum assembly axis, motorized cutter head assemblies swingably mounted on said drum structure for movement toward the drum structure axis, means carried by said drum structure urging said cutter head assemblies toward a log moving in a coaxial manner through the drum structure, a hydraulic tank structure rotatable with said drum structure, counterrotating means adapted for powered rotation opposite to said one direction of drum rotation, drum mounted pump components in driven connection with said counterrotating means providing the cutter head assemblies with a power source.

8. The log peeling machine claimed in claim 7 additionally including a receiver and antenna mounted on said peeler drum assembly for the reception of radio transmitted signals, and electro-mechanical components on said peeler drum assembly responsive to receiver generated signals to regulate hydraulic fluid flow to said cutter head assemblies and associated components.

9. The invention claimed in claim 7 wherein said conveyor frame includes means slidably engaging upright frame members of the log peeling machine to retain said conveyor frame horizontal throughout its range of movement.

10. The invention claimed in claim 7 wherein said log conveyor includes log engaging members each of arcuate configuration joined in a continuous manner, said conveyor frame including friction reducing means supporting the upper run of said log conveyor.

11. The invention claimed in claim 7 wherein said rotatable means of the log hold down assembly comprises powered rolls oppositely disposed from said pivot means.

12. The invention claimed in claim 7 wherein each of said cylinders are of the double rod type having a fixed piston rod and piston with the cylinders coupled to said frames, each of said cylinders having ports adjacent their opposite ends.

13. The invention claimed in claim 7 additionally including a fluid circuit having pressure compensated flow divider means therein apportioning the fluid flow to the conveyor assembly motor and hold down assembly motor to assure predetermined motor speeds.

14. The invention claimed in claim 7 wherein said peeler drum structure includes mounting tubes parallel to the drum axis and swingably mounting said cutter head assemblies.

15. The invention claimed in claim 7 wherein said tank structure is radially spaced from said drum structure, said tank structure comprises tanks of arcuate shape joined to form a tank structure of annular shape.

16. The invention claimed in claim 15 wherein each of said tanks includes a pressurized bladder.

17. The invention claimed in claim 7 wherein said counterrotating means includes bearing means concentrically mounted on said drum structure and power transmission means in driving engagement with said drum mounted pump components.

18. The invention claimed in claim 17 additionally including motors on the machine frame in driving connection respectively with said drum structure and with said counterrotating means, valve means in communication with a source of fluid pressure and with said frame mounted motors for regulation of fluid flow to said motors in an indirect ratio whereby said drum mounted components are driven at an optimum speed regardless of changes in drum structure R.P.M.,.

19. The invention claimed in claim 7 additionally including a power take-off arrangement whereby an electrical power source mounted on the drum structure is driven by said counterrotating means.

20. The invention claimed in claim 7 wherein said cutter head assemblies each include a housing, a rotatable cutter block journalled in said housing for log contact, wheel assemblies, at least one of said wheel assemblies adjustably supported on said housing, depth of cut control means mounted on said housing and coupled to said one wheel assembly and operable to vary the relationship between the cutter block in said housing and the log surface whereby the peeling depth of cut may be varied.

21. The invention claimed in claim 20 wherein said cutter head assemblies additionally include pivot means permitting wheel assemblies of each housing to adapt to rolling engagement with an inclined tapering log surface.

22. The invention claimed in claim 21 wherein said cutter head assembly additionally includes a cutter head housing lock for retaining the housing against rotation about the axis of said pivot means when the cutter head assembly is not fully supported by log surfaces.

23. In a log peeling machine having infeed and outfeed conveyor apparatuses disposed on a machine frame for the transfer of a log in an axial manner, the improvement comprising a peeler drum assembly disposed on said machine frame intermediate said apparatuses, said peeler drum assembly comprising, a drum structure rotatably supported by the machine frame and adapted for powered rotation in one direction about a horizontal axis constituting the peeler drum assembly axis, motorized cutter head assemblies swingably mounted on said drum structure for movement toward the drum structure axis, means carried by said drum structure urging said cutter head assemblies toward a log moving in a coaxial manner through the drum structure, a hydraulic tank structure rotatable with said drum structure, counterrotating means adapted for powered rotation opposite to said one direction of drum rotation, and drum mounted pump components in driven connection with said counterrotating means providing the cutter head assemblies with a power source.

24. The invention claimed in claim 23 wherein said peeler drum assembly additionally includes a receiver and antenna for reception of radio transmitted signals, and electro-mechanical components responsive to receiver generated signals to regulate hydraulic fluid flow to said cutter head assemblies and associate components.

25. The invention claimed in claim 23 wherein said peeler drum structure includes mounting tubes parallel to the drum axis and swingably mounting said cutter head assemblies.

26. The invention claimed in claim 23 wherein said tank structure comprises tanks of arcuate shape joined to form a tank structure of annular shape.

27. The invention claimed in claim 26 wherein each of said tanks includes a pressurized bladder.

28. The invention claimed in claim 23 wherein said counter-rotating means includes bearing means concentrically mounted on said drum structure and power transmission means in driving engagement with said drum mounted pump components.

29. The invention claimed in claim 23 additionally including motors on the machine frame in driving connection respectively with said drum structure and with said counterrotating means, valve means in communication with a source of fluid pressure and with said frame mounted motors for regulation of fluid flow to said motors in an indirect ratio whereby said drum mounted components are driven at an optimum speed regardless of changes in drum structure R.P.M.,.

30. The invention claimed in claim 23 additionally including a power take-off arrangement whereby an electric power source mounted on the drum structure is driven by said counter-rotating means.

31. The invention claimed in claim 23 wherein said cutter head assemblies ech including a housing, a rotatable cutter block journalled on said housing for log contact, wheel assemblies, at least one of said wheel assemblies adjustably supported on said housing, depth of cut control means mounted on said housing and coupled to said one wheel assembly and operable to vary the relationship between the cutter block in said housing and the log surface whereby the peeling depth of cut may be varied.

32. The invention claimed in claim 31 wherein said cutter head assembly each additionally include pivot means permitting the wheel assemblies of each housing to adapt to rolling engagement with inclined tapered log surface.

33. The invention claimed in claim 32 wherein said cutter head assemblies each additionally include a cutter head housing lock retaining the housing against movement about the axis of said pivot means when the cutter head assembly is not fully supported by log surfaces.

* * * * *